(12) United States Patent
Hansen et al.

(10) Patent No.: US 8,515,936 B2
(45) Date of Patent: *Aug. 20, 2013

(54) METHODS FOR SEARCHING PRIVATE SOCIAL NETWORK DATA

(75) Inventors: Scott B Hansen, New York, NY (US); Andrew S Hansen, Bountiful, UT (US)

(73) Assignee: Pear Software, LLC, Bountiful, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,561

(22) Filed: Jan. 18, 2012

(65) Prior Publication Data

US 2012/0185474 A1   Jul. 19, 2012

Related U.S. Application Data

(63) Continuation of application No. 12/683,411, filed on Jan. 6, 2010, now Pat. No. 8,121,999.

(60) Provisional application No. 61/142,891, filed on Jan. 6, 2009.

(51) Int. Cl.
*G06F 17/30* (2006.01)

(52) U.S. Cl.
USPC ........... 707/706; 707/723; 707/726; 707/781; 707/783

(58) Field of Classification Search
USPC ............... 707/715, 769, 781, 783, 723, 726; 726/2–3, 17, 27
See application file for complete search history.

(56) References Cited

U.S. PATENT DOCUMENTS

| | | | |
|---|---|---|---|
| 6,611,349 B1 | 8/2003 | Vogt et al. | |
| 7,006,818 B1 | 2/2006 | Yu | |
| 7,032,006 B2 * | 4/2006 | Zhuk | 709/206 |
| 7,289,971 B1 | 10/2007 | O'Neil et al. | |
| 7,346,613 B2 | 3/2008 | Hurst-Hiller et al. | |
| 7,730,030 B1 | 6/2010 | Xu | |
| 8,201,081 B2 * | 6/2012 | Stroe et al. | 715/234 |
| 8,346,753 B2 * | 1/2013 | Hayes | 707/709 |
| 2001/0044827 A1 * | 11/2001 | Zhuk | 709/205 |
| 2002/0165856 A1 | 11/2002 | Gilfillan et al. | |
| 2002/0188735 A1 | 12/2002 | Needham et al. | |
| 2004/0037259 A1 | 2/2004 | Steinberg | |
| 2006/0026140 A1 | 2/2006 | King et al. | |
| 2006/0053097 A1 * | 3/2006 | King et al. | 707/3 |
| 2006/0074919 A1 | 4/2006 | Grover et al. | |
| 2006/0133265 A1 | 6/2006 | Lee | |
| 2006/0173831 A1 | 8/2006 | Basso et al. | |
| 2007/0067297 A1 * | 3/2007 | Kublickis | 707/9 |
| 2007/0078835 A1 | 4/2007 | Donnelli | |
| 2008/0133716 A1 | 6/2008 | Rao et al. | |

(Continued)

*Primary Examiner* — Hanh Thai
(74) *Attorney, Agent, or Firm* — Andrew S. Hansen (57) ABSTRACT

A method for searching a database that includes private network data includes providing one or more databases including a plurality of database entries, a first portion of the database entries including private social network data and a second portion including non-social network data that is publicly accessible on the World Wide Web. The method further includes receiving a keyword search request from a search request user and searching the one or more databases or a keyword index thereof using one or more keywords and ranking the search result items according to relevancy. The method also includes displaying at least a portion of the search results items as a selectable link where a first portion of the selectable links are to private network data and a second portion of the links are to public, non-social network data.

20 Claims, 5 Drawing Sheets (56) References Cited

U.S. PATENT DOCUMENTS

| | | |
|---|---|---|
| 2008/0141117 A1 | 6/2008 | King et al. |
| 2008/0147810 A1 | 6/2008 | Kumar et al. |
| 2008/0222295 A1* | 9/2008 | Robinson et al. ............. 709/227 |
| 2008/0313172 A1 | 12/2008 | King et al. |
| 2009/0031232 A1 | 1/2009 | Brezina et al. |
| 2009/0070306 A1* | 3/2009 | Stroe et al. ........................ 707/4 |
| 2009/0243785 A1 | 10/2009 | Deicke et al. |
| 2009/0307198 A1* | 12/2009 | Zhang et al. ...................... 707/4 |

* cited by examiner

Relational Database

| 304 Entry | 302 Name or Type | 306 Location | 308 Activities | | Related 310 Data |
|---|---|---|---|---|---|
| 1 | Beach | Geocoordinate 1 | Flying kite | Camping | Text |
| 2 | Snowbird | Geocoordinate 2 | Skiing | Rock climbing | Photograph |
| 3 | Mueller Park | Geocoordinate 3 | Cycling | Camping | |
| 4 | Andrew's House | Geocoordinate 4 | Hang out | Draft patents | Music |
| 5 | | Geocoordinate 5 | Water ski | Hot tubbing | |
| 6 | | Geocoordinate 6 | Running | Biking | Video |
| 7 | | Geocoordinate 7 | Reading | | |
| 8 | Restaurant | Geocoordinate 8 | Eating | | |
| 9 | Bar | Geocoordinate 9 | Drinking Alcohol | Dancing | *** Rating |

METHODS FOR SEARCHING PRIVATE SOCIAL NETWORK DATA

CROSS REFERENCE TO RELATED APPLICATIONS

This application is a continuation in part of U.S. patent application Ser. No. 12/683,411, filed Jan. 6, 2010, titled "Methods For Searching Private Social Network Data," which claims the benefit of U.S. Provisional Patent Application 61/142,891, titled "Geocoded Items of Interest and Methods for Generating Places of Interest and Searching Same," Filed Jan. 6, 2009, both of which are hereby incorporated herein by reference.

BACKGROUND

The present disclosure relates to methods for searching private network data stored in a computer database. Currently systems exist for searching personal private databases. For example, social network sites such as Facebook allow users to perform a search within their private network data to find items of interest. The existing searching solutions, while adequate for many searches are significantly limited in their ability to give a user a search result that is highly targeted unless the searcher knows exactly what the searcher is looking for. For example, searching private social networks is effective if the user knows particular text associated with a data entry. However, complex determinations of search results are less frequently implemented.

DESCRIPTION

In an embodiment of the invention, a method is described for performing a search query on a database that includes private social network data. The private social network data can be searched in combination with non-social network data that is publicly accessible on the World Wide Web. The search results include a plurality of search result items that are ranked and/or organized into a hierarchy. The ranking can be determined using social network data and/or historical search data derived from database searches that include private social network data. In one embodiment, the search result is displayed on a graphical user interface (GUI) and includes links to both private social network data and non-social network data.

For purposes of this invention the term private social network data includes social network data generated by a social network user in an online social network and for which the social network user providing the data has restricted access of the data to a limited number of other social network users in the online social network. Examples of private social network data include, but are not limited to, contacts, photographs, comments, videos, status indicators, addresses, and events posted in a social network and for which social network users must have access rights to view the data. Specific examples of private social network data include photos and contacts that are only shared with friends on an online social network such as Facebook.

For purposes of this invention, the term "non-social network data" refers to data that is publicly available on the World Wide Web and is not associated with a social network user. Examples of nonsocial network data include, but are not limited to data available from corporate webpages and general websites such as www.wikipedia.org, www.yahoo.com, www.amazon.com, www.buy.com, and the like. Data that is posted on or uploaded to an online social network by a social network user is not "non-social network data."

In one embodiment, the method includes providing one or more databases that include a plurality of database entries. A first portion of the database entries includes private social network data and a second portion includes non-social network data that is publicly accessible on the World Wide Web.

The private social network data may include any online social network data that is uploaded by a social network user to a social network server for purposes of sharing the social network data with a limited number of other social network users. The social network data can include personal photographs, social network profile data, the social network user's location or status and/or comments about other pieces of data provided by a social network user. In a preferred embodiment the private social network data is generated from social network users who are linked together by having received and accepted a request to be associated with each other in the online social network.

In one embodiment, the social network data is stored in a social network database on a social network server operated by a social network provider, usually in association with a private account established by the user. A private account means a formal relationship established between a social network provider and a user in order to provide individual social network services. Privacy is an important feature of an account in a private online social network. A plurality of permission rules can be associated with the private online social network data to restrict access to the data. The data is usually restricted to particular social network users with whom the user providing the social network data has an established social network relationship (e.g., an "online friend").

For example, Facebook is a social network provider that provides free access to a social network server were a user can establish a private user account and receive social network services offered by Facebook. Facebook can limit access to its social network database thus establishing a measure of privacy for its users, the user's account, and any data associated with the user's account.

In a more specific example, storing and displaying a photo is a service provided by Facebook. A user, (e.g., User 1), establishes an account with Facebook and Facebook provides the service of storing a photo by first allowing User 1 to upload a file containing the photograph and then storing the file on a social network server. Facebook then provides the service of displaying the photo by providing a webpage containing the photograph. In one instance, the photograph may only be available online through a webpage provided by Facebook and a user account may be required for accessing the webpage to display the photograph. Limiting viewing of the photograph to Facebook users provides a measure of privacy to the social network user providing the photograph.

In another instance Facebook can provide a privacy setting to User 1 that restricts access to the photograph according to a privacy setting provided by Facebook. In one embodiment, the privacy setting restricts access of the photo or a page displaying the photo to an online friend having an established relationship with User 1. Online friends are usually stored in a friends list. The friends list is usually populated by a user, for example User 1, sending an invitation to a second Facebook user, (e.g., User 2), with a request to become "friends" (i.e., a friend request), and User 2 accepting the friend request, thereby establishing the online social network relationship. Alternatively, the request can be sent from User 2 to User 1 and the relationship being established by User 1 accepting. In many embodiment, each user in the social network maintains a unique friends list associated with the user's account. An online friend or a friends list can be used to establish permission rules.

In yet another instance a privacy setting can include read or write permissions in a file, folder, or directory associated with social network data and/or individual database entries that contain private social network data.

The permission rules used in the methods of the present invention allow keyword searches to be performed on the private social network data while following the privacy settings of the online social network. The permission rules can be associated with the private social network data in several different ways. In one embodiment social network data can be restricted by applying a permission rule to a database or a subset of the database. Alternatively, the permission rule can be applied to individual database entries (e.g. individual photographs, profiles, events, etc.). In yet another embodiment, a keyword index of the social network data can be generated from the social network database, and the permission rules can be associated with the index database and/or individual database entries in the index database.

The permission rules define access rights to a subset of the private social network data. Since the database includes private social network data for many different social network users and most of the social network users will not have access rights to most of the private social network data, the permission rules provide instructions that a social network server and/or a search engine server can use to properly search and/or display the particular private network data to only users that are authorized in the social network to view the particular private social network data.

In one embodiment, the permission rules can include an authorization key that when matched with authentication data from a search request user indicates to the social network server and/or a search engine server which if any of the private social network data the search request user is authorized to view. In one embodiment, the permission rules follow the same privacy rules established by a social network user's online social network account. For example, in one embodiment a search of this social network data and/or the display of the social network data, for any one particular social network user, is restricted to social network data for which the one particular social network user has the authorization to view the private social network data within the social network. In one embodiment, the social network server and/or search engine server use a search request user's social network logon (i.e. a social network username and/or password) to determine the subset of data for which the search request user has access rights. A user's access rights to social network data can be expanded to include social network data authorized to another user's account so long as the authentication for the other user is authenticated and access is granted according to the permission rules. For example searching a friend of a friend is possible so long as the authentication data for the friends account can be obtained. Multiple accounts can be added expanding the accessible social network data.

Figure 7:
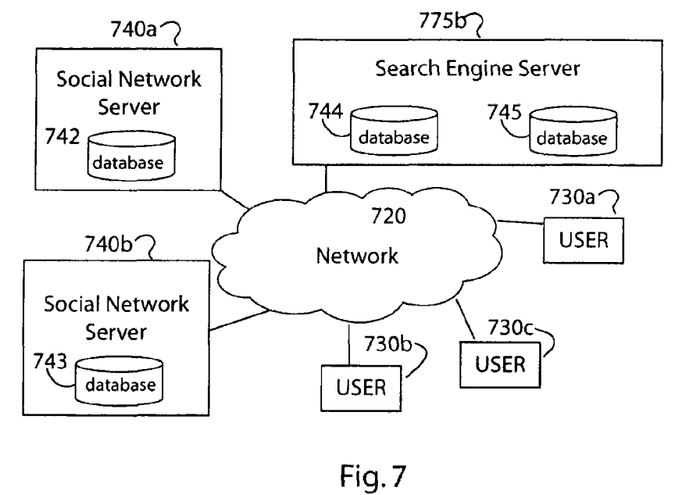
FIG. 7 illustrates a network including multiple social network servers and a search engine server according to one embodiment of the invention.
Figure 8:
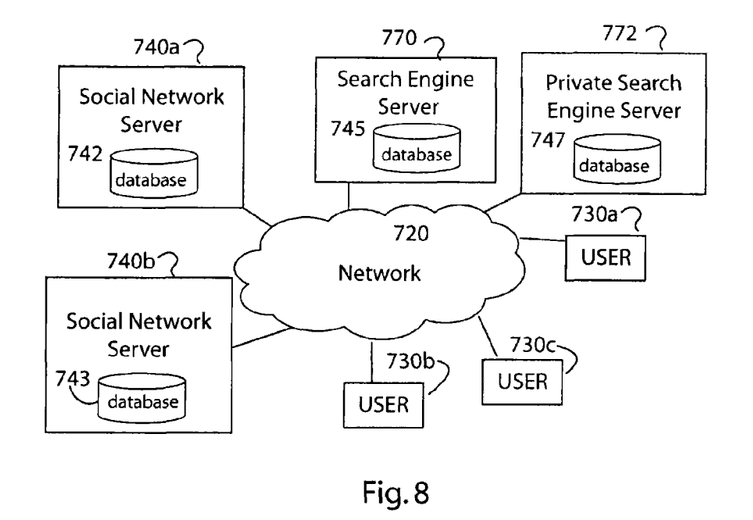
FIG. 8 illustrates a network including multiple social network servers and multiple search engine servers according to one embodiment of the invention.

FIGS. 7 and 8 illustrate example networks that can be used to perform a search of private social network data according to some embodiments of the invention. With respect to FIG. 7, network 720 includes a plurality of users 730*a*, 730*b*, and 730*c*. Network 720 also includes a plurality of social network servers 740*a* and 740*b*. Social network server 740*a* includes a database 742 and social network server 740*b* includes a database 743. Users 730 participate in one or more social networks provided by social network servers 740*a* and 740*b*. Private social network data can be stored on database 742 and/or database 743. The private social network data stored on databases 742 and 743 can be provided, at least in part, by users 730*a*, 730*b*, and 730*c*. Each of users 730 has a logon, username, and password to access one or more of social network servers 740*a* and 740*b*. Social network servers 740*a* and 740*b* restrict access to subset of private social network data stored on databases 742 and 743 according to permission rules set by the privacy settings of the accounts of users 730. In one embodiment, the permission rules are restricted at least in part based on the presence or absence of an established relationship with the user providing the private social network data (i.e., the private social network data is restricted to users who are "friends" with the social network user that uploaded data to the social network server).

Network 720 also includes a search engine server 775*b*. Search engine server 775*b* includes database 744 and database 745. In one embodiment database 744 includes non-social network data and/or a keyword index database of non-social network data and database 745 may be a keyword index of the private social network databases 743 and 742 stored on social network server 740*b* and 740*a*, respectively.

Search engine server 775*b* is configured to receive a request from a user 730, which when requesting a search, is a social network search request user. Users 730 can be social network users, social network search request users, or both. Search engine server 744 can provide users 730 with a search request page available through a graphical user interface such as a web browser. User 730 enters one or more keywords into a search box for requesting a search and search engine server 775*b* receives the one or more keyword search terms for use in performing a search. The keyword search terms are then compared to terms derived from or actually present in the private social network data of database 742 and/or 743 and/or the keyword index database 745. In addition search engine server 775*b* searches database 744 for nonsocial network data. Matching keyword terms in the databases searched and/or data that meets one or more search term criteria populate a list of search result items.

In order to determine the private social network data that can be searched and/or displayed, the search engine server 775 receives authentication data associated with the search request user. The authentication data identifies access rights of the search request user to a subset of the private social network data according to at least one of the permission rules. For example, the authentication data that can be used by the search engine server may be a logon and/or password for a social network account. The logon information can be used by the search engine server to identify the private information for which the search request user has authority to view and/or access a subset of private social network data. In one embodiment, the permission rules can be applied before search engine server 775b performs a search of the one or more databases; or alternatively, the permission rules can be applied after performing a search of the databases. In some embodiments the permission rules can be applied just prior to the act of displaying the search result items. However, even in the embodiment where the private social network data is searched before applying the permission rules, the permission rules are applied to the search process prior to displaying search result items to avoid displaying private social network data and/or to avoid providing a link to data that the search request user does not have access rights to.

FIG. 8 illustrates an alternative embodiment in which search engine server 770 includes a single database having private social network data and nonsocial network data and/or a keyword index thereof stored on database 745. In this embodiment, the permission rules may be stored in association with the individual entries of database 745. Network 720 shown in FIG. 8 also includes a private search engine server 772, with a private database 747. Database 747 may include data that is not associated with a social network, but is nevertheless private data. In one embodiment of the invention and nonsocial network private database can be used in the method of the present invention and privacy rules of the data on database 747 can be used similarly to the account privacy rules of social network server 740.

The searching of the one or more databases generally involves matching the keyword from the search with a keyword in the one of more databases to generate a list of search result items. The search may also include searching using any search criteria known in the art for identifying relevant data in an internet-based database. The search result items are then arranged into a hierarchy by ranking the search result items according to a desired schema. For example, in a preferred embodiment the search result items are arranged by placing the most relevant search result items higher in the list of the search results.

The methods of the invention utilize the private social network data to determine the hierarchy of the search result items to be displayed. Typically, the hierarchy is determined by ranking each item of the search results according to predicted relevance and displaying most relevant search results higher or sooner in that list.

In one embodiment, the hierarchy is determined at least in part by weighting search results to private social network data differently than nonsocial network data. In one embodiment private social network data is weighted higher than nonsocial network data.

In another embodiment, the private social network data can be used to determine the hierarchy of search result items that contain only nonsocial network data. That, even if none of the search result items containing private social network data results in a keyword match, the private social network data may provide valuable information for accurately predicting the relevancy of search result items that contain nonsocial network data. For example, private profile information and/or information about a search request users "friends" can help determine the relevancy of various search result items found in any non-social network database.

In one embodiment, private social network data can be used to determine the relevancy of the search result item including private social network data. There are numerous associations that can be made from a users social network data to determine the relevancy of other social network data in a search result. One example includes determining the number of friends in common with this social network user that provided the private social network data associated with the search result item. A greater number of common "friends" may be an indication that the search result item is more relevant than other search result items provided by users who have fewer "friends" in common.

In one embodiment, historical search data may be used to determine the hierarchy of the search result items. In this embodiment the previous selections in the search results made by search request users is indicative of the relevant of search results with similar or identical search result items. Thus, in this embodiment a previous users behavior (whether it be the same search request user or a different search request user) can be used to predict which of the search result items is most likely to yield the search result data that the search request user desires. In a preferred embodiment, the historical search data may include previous users selections of private social network data in this historical search data may be used to rank search result items for either or both private social network data and/or nonsocial network data.

Search engine server 775b and/or search engine server 770 can use one or more algorithms that apply a plurality of weighting terms to determine the hierarchy or ranking of the search result items. In a preferred embodiment, the algorithm utilizes historical search data. In one embodiment, the weighting term used in the algorithm is derived from social network data. For example, the weighting term may be the presence or absence of an established social network relationship.

In one embodiment, the one or more databases or index databases include a relational database having a plurality of activity entries and a plurality of locations respectively associated therewith, or an index thereof. In one embodiment, at least a portion of the locations are geo-coordinates.

Figure 6:
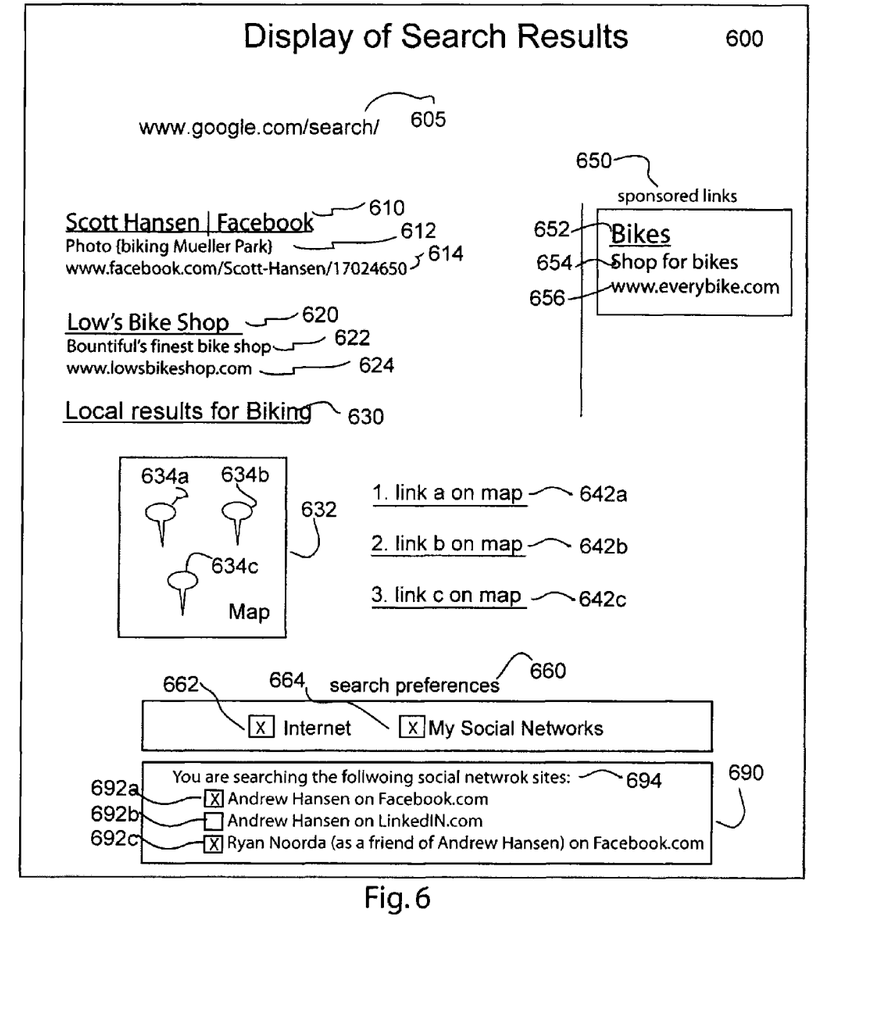
FIG. 6 illustrates a display of an example search result according to one embodiment of the invention.

In one embodiment, search engine server 775 and/or 770 generates a webpage to display the list of search result items according to the hierarchy. An example of a search results page that can be generated to display the list of search result items is illustrated in FIG. 6 described above. In a preferred embodiment, the method includes displaying both private social network data and nonsocial network data and/or a link thereto on the same search results webpage or list. FIG. 6 described above shows a webpage displaying the link to non-social network data and private social network data. For example, link 612 and/or 610 may be a link to private social network data. In one embodiment for a search engine server to display links 610 and/or 612, search engine server first received authorization data from the social network searcher. This private network data or link thereto is displayed with non-social network data or a link thereto as provided in the links to "Low's Bike Shop". In one embodiment, the map 632 and/or links 642 can include private social network data, nonsocial network data, or both. In one embodiment, search preferences 660 can allow a user to select searching on the Internet 662 and/or social networks 664, which are social networks for which the search request user has a user account. Input box 690 include text 694 to indicate that the user can select a subset of their online social networks are searching. For example options 692a, 692b, and 692c allow the search request user to select particular social network databases and/or subsets of the social network database to be searched.

In one embodiment of the invention, a method for displaying search results from a private social network database in combination with a web-based search includes (i) providing a graphical user interface (GUI) to a search request user; (ii) providing one or more databases including a plurality of database entries, a first portion of the database entries including private social network data and a second portion including non-social network data that is publicly accessible on the World Wide Web; (iii) associating a plurality of permission rules with the first portion of database entries, the plurality of permission rules individually defining access rights to a respective subset of the private social network data; (iv) receiving a keyword search request from a user; (v) receiving authentication data associated with the user, wherein the authentication data identifies access rights of the user to a subset of the private social network data according to at least one of the permission rules; and (vi) searching the one or more databases or a keyword index thereof using one or more keywords received in the keyword search request and generating a search result including a plurality of search result items, at least a portion of which are displayed through the GUI as a plurality of selectable links, a first portion of the selectable links link to one or more databases having private social network data and a second portion of the selectable links link to a database having non-social network data.

In one embodiment, the searching is performed on an index database and the links provided in the search results include at least one link to a social network database on a social network server. Alternatively, the GUI stores logon information for obtaining access to one or more social networks of the search request user. In one embodiment, selecting the selectable link to the private social network data directs the user to a logon page for obtaining authorized access to a social network server storing the private social network data.

Any of the foregoing method may also include displaying an advertisement in association with the search results. In a preferred embodiment the advertisement is selected at least in part based on the one or more keywords received in the search request. The advertisement may include a selectable link that redirects the search request user to another website and/or offer goods or services to the search request user. In a preferred embodiment, the advertisement is sold to an advertiser based at least in part on the frequency with which users select keywords associated with the advertisement. An example of an advertisement that can be displayed according to the methods of the invention is shown in FIG. 6 as sponsored link 650.

The methods for searching private network data can also be performed in combination with one or more features of embodiments related to generating point of interest (POI) databases described below.

Figure 1:
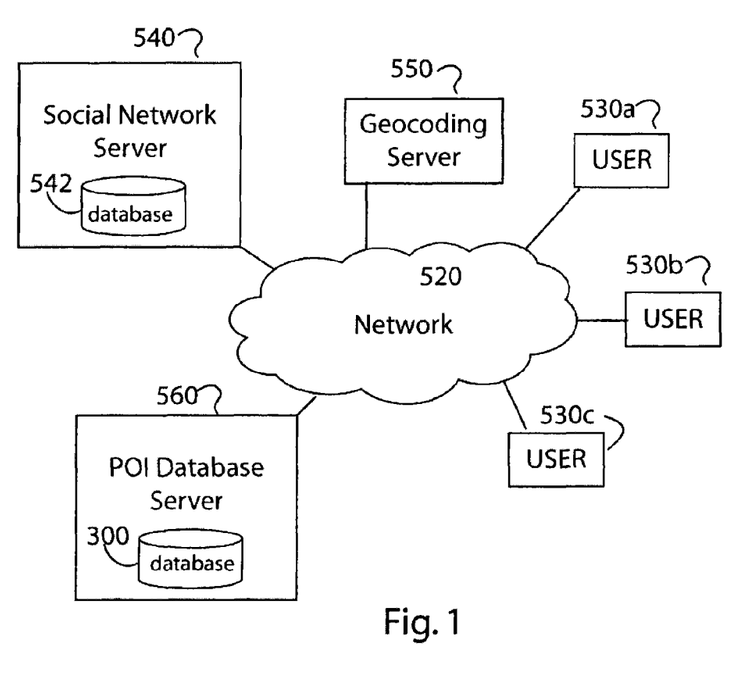
FIG. 1 illustrates a network including a social network server and a POI database server according to one embodiment of the invention.

Those skilled in the art will recognize that the present invention will most often be carried out on a computer network. FIG. 1 illustrates an example network that can be used to carry out the methods for generating an activity-based POI. A network 520 is connected to the personal electronic devices of a plurality of users 530a, 530b, and 530c. Preferably the number of users is in the tens of thousands or even millions. The users access the social network 540 by logging on to their respective user accounts stored on the social network database 542 for the social network. Using a web interface provided by social network server 540, the social network users upload social network data to database 542. In some embodiments, social network database 542 may store account logon information, photographs, point of interest entries (including location entries and activities entries), profile information, privacy rules, social network user associations (e.g., friend information), etc. In one embodiment, an activity-based POI database server 560 can be associated with network 520 for storing POI data. The social network data can be stored in association with the account of the respective user a, b, or c that provided the social network data and users a, b, and c can be authorized or not authorized to view the photographs of the other users. For example, User b can have access to view the social network data associated with the user account of User b. Users a, b, and c can make comments regarding the social network data of each others social network data. The comments can be stored in association with the social network data in database 542. In addition, the comment can be identified as being contributed by a particular user and the identity of the user making the comment can be used in geocoding any portion of the social network data, including activity data. Moreover the historical text associated with the social network data, including the comments to the social network data can be used to determine the map coordinates for activities performed by a social network user. Users a, b, and c can tag people in photographs of activities being performed by social network users. Preferably the tags are identified as being a person in the social network.

Geocoding server 550 executes software that accesses social network server and obtains permission from each of the social network users to geocode the activities provided by the user (e.g., user a, b, and/or c). The geocoding software may access the historical data stored in social network 540 and determine a map coordinate as described above. In one embodiment, geocoding server 550 is a separate computer that communicates with social network 540 over a public network through a secure connection. In an alternative embodiment, geocoding server can be incorporated into the same server system as social network 540. Geocoding server 550 can maintain any portion of the information for geocoding the activity information.

Figure 2:
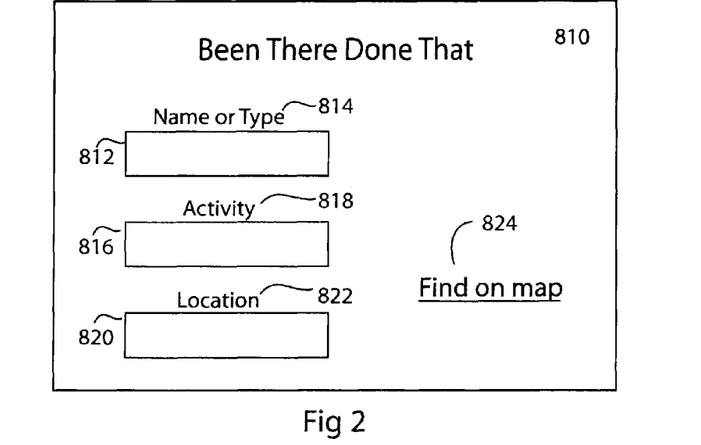
FIG. 2 illustrates a user interface for collecting activity information in a social network.

FIG. 2 shows a simplified user input interface for obtaining a POI according to one embodiment. The user interface 810 is a web page on a social network (e.g., network 520) that optionally invites a user to input into text box 812 a name or type of point of interest. The request for a name or type of point of interest is indicated by text 814. Similarly the user input interface 810 requests an activity to be input into text box 816 and text 818 indicates that the text should be an activity. A thirds text box 820 requests the location of the activity as indicated by text 822. A link 824 is selectable and can be used to help the user identify the location. For example link 824 can provide a map through which the user can identify the location of the point of interest. Optionally the name or type of POI can be obtained using the location obtained from text box 820 or from the link 824, which directs the user to a map service.

Figure 3:
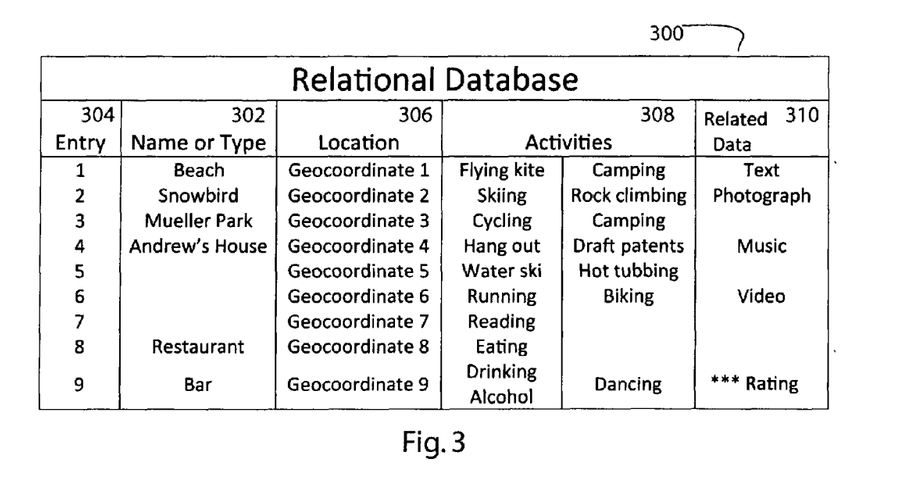
FIG. 3 illustrates an activity-based relational database.

FIG. 3 describes an activity-based relational database 300 according to one embodiment of the invention. FIG. 3 shows database 300 having entries 302 of which nine are illustrated. Database 300 preferable includes at least tens of thousands of entries, more preferably at least hundreds of thousands of entries, and most preferably at least tens of millions of entries. Each entry optionally includes a name or type 304 and a location 306 and one or more activities 308. Location 306 can be a map coordinate and preferably a geo-coordinate. At least a portion of activities 308 are activity keywords for which the name or type 304 of location 306 is non-descriptive of the activity. In one embodiment at least a portion of the locations 306 each include a plurality of activities that can be performed at location 306. In a preferred embodiment, the name or type 304 is non-descriptive of each of the plurality of activities that can be performed at location 306.

Relational database 300 includes a plurality of differently configured entries that can be included in the database according to the invention. For example, entry 1 includes a name or type 304 keyword of "beach" a location 306 that is a geocoordinate (represented for simplicity as merely "geocoordinate"); typically the location entry would be a numerical value with degrees and/or minutes) and two activity keywords "flying kite" and "camping" that are both non-descriptive of the name or type 304 keyword "beach." In contrast entry 9 includes a name or type 304 of the keyword "bar," a location 306 of "geocoordinate 9," and activities 308 of keywords "drinking alcohol" and "dancing." The name or type 304 keyword "bar" associated with location 306 for entry 9 is non-descriptive of activity 308 for "dancing," but is descriptive of activity 308 "drinking alcohol."

Relational database 300 can include entries for which names or type 304 is not included, such as entries 6 and 7. In this embodiment, geocoordinate is a street address that is not identified in relational database 300. However, "street" is non-descriptive of "running" and "biking" since running and biking are not activities that can be performed on all streets. In contrast, entry 7 includes location 306, which is the location of a "library" which is descriptive of activity 308 "reading." While name or type 304 is an optional component of relational database 300, including name or type 304 is typically preferred so that it can be searchable and/or provided as a search result. In a preferred embodiment, at least about 15% of the activities 308 in the relational have locations 306 with names or types 304 that are non-descriptive of the activities 308 of respective entries 302, more preferably at least about 40%, even more preferably about 65%, and even more preferably at least about 90%, or even essentially all.

Database 300 can also include additional "related data" 310. Related data 310 can be text such as comments from the social network user making the entry or comments from social network friends. Related data 310 can include social network photographs or photographs from outside the social network. The photographs can be associated by location (e.g. using a match for a geocoordinate of the location where the photograph was taken with the location of 6 the POI) or the photograph can be provided by a social network user from a personal or individual social network users list of activity-based POIs. The additional related data can also include user ratings regarding the POI (e.g. entry 9 has a 3 star rating out of 5 stars, thereby indication the user's relative approval or disapproval of the location). The related data can be used for returning search result (e.g. text can be used for keyword searching to provide additional search criteria). Alternatively, the additional data can be provided as a component of the search results and/or a selectable link can be provided to the searcher for accessing the text or a file of the related data in association with the activity based search result.

Figure 4:
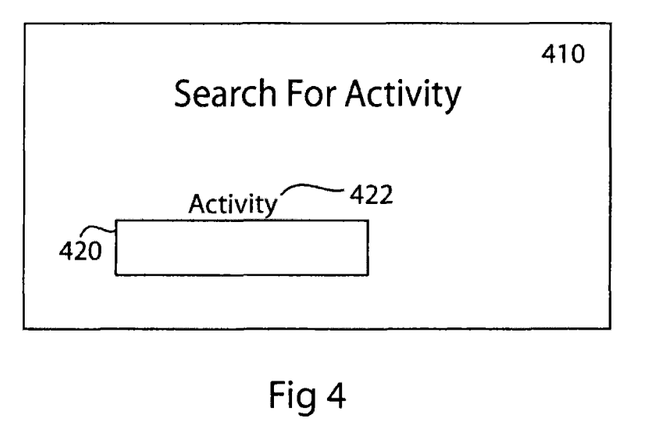
FIG. 4 illustrates a user interface for allowing a user to perform a keyword search of the activity-based relational database of FIG. 3.

FIG. 4 illustrates a search that can be performed using a relational database, such as but not limited to relational database 300, which can be stored in a database server 560. The search maybe performed on a network, such as but not limited to network 520. Relational database 300 may be searched by indicating to the user that the search term should be a query for an activity. For example a web page 410 can include a text box 420 that has associated text 422 that says, "activity." Upon entry a search term in box 420, the software providing user interface 410 carries out a search of database 300 and returns one or more locations 306 associated with the activity entered into box 420. The search results may be displayed as a list or identified by location on a map. The list or map may include contextually relevant advertisements; the advertisements are preferably user selectable links that direct the user to a particular website.

Figure 5:
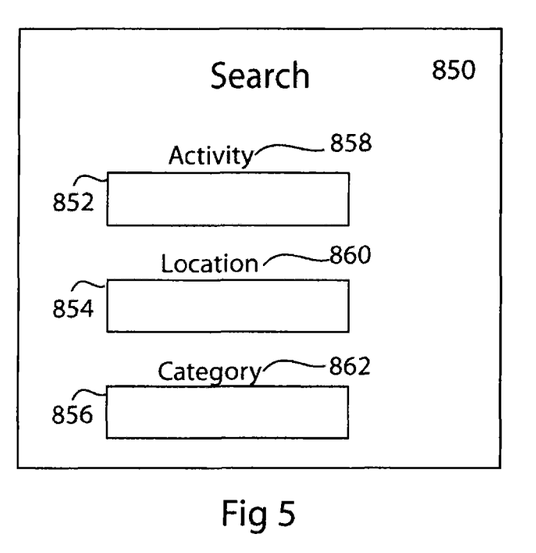
FIG. 5 illustrates an alternative user interface for allowing a user to perform a keyword search of the activity-based relational database of FIG. 3.

FIG. 5 illustrates a similar web page 850 that includes text boxes 852, 854, and 856 for receiving the user's input for an activity search term, a location search term, and/or a category search term, respectively. Each of the text boxes is associated with text. Text 858 indicates that the user should input an activity, text 860 indicates that a location should be input, and text 862 indicates that a category should be input. The search can require all or a portion of the search boxes to be filled. The search criteria from each of the text boxes filled can be used to search different groups within relational database 300. For example, the data input into the "activity" text box 852 is used to search the activities 308 stored within the relational database 300. Similarly location 306 and name or type 304 information stored in relational database 300 can be searched according to the criteria input by the user.

The formation of an activity-based relational POI database that includes a separate category for activities that can be performed at a location provides opportunities to form POIs that would be difficult to generate using traditional methods for generating POIs. For example, POIs where the activity is "hanging out with friends" or "meeting people" can be easy to identify by obtaining the activity but can be difficult to obtain through the name of the place since these activities can be performed in any one of numerous POIs that are descriptive of different activities. For example, "hanging out" can be done at a mall, a beach, a coffee shop, a library, or a school, but the fact that a place is a mall, beach, coffee shop, library, or school, provides almost no indication if people are interested in hanging out at any one particular location.

As mentioned above, in a preferred embodiment the activities and optionally the name or type of the POI are obtained without providing the input user with categories for the activities and/or the name or type of the POI. Thus, in a social network providing tens of thousand of POIs or millions of POIs, there are numerous different terms referring to the same POI location and numerous activities that can be performed at any given location. Some of the activity terms refer to the same activity and some of the terms refer to different activities. For example, in database 300, entry 3 includes "cycling" and entry 6 includes "biking" These two different terms often refer to the same or similar activities. In contrast, entry 1 includes activity 308 of "camping," which is typically not synonymous with "biking" In a preferred embodiment, the relational database groups similar terms for activities that have similar meanings. The data provided by millions of users can identify nearly all the terms that different users will use to describe various different activities. Server 560, or another computational device, can relate similar terms based on the probability that a particular user is searching for an activity that is typically identified by other users with a different term having similar meaning Identifying the way in which different people describe different activities allows a search to return a POI for which another user has described the same activity differently.

The present invention also includes methods for providing activity-based searches. The activity-based search includes providing a relational database that includes a plurality of POIs, each POI including (i) the name or type of the POI, (ii) the location of the POI, and (iii) an activity that can be performed at the place of interest where the name of the place of interest is non-descriptive of the activity. The method further includes providing a user search interface configured to receive a search request from a search user, the search request including a search term for an activity. In response to the search request from the user, parsing the relational database for activities that correspond to the activity search term and identifying a plurality of locations that are associated with the activity of interest. Then displaying the plurality of places of interest identified by searching for the activity term. The places of interest displayed can have selectable links that lead the search user to further information regarding the point of interest. For example, the displayed POI can include a selectable link to a map for receiving directions, a selectable link to a Wikipedia entry, and/or a list of comments from other users regarding the activity.

The hits or matching search criteria can be used to produce a list of search results. The list can have an order that is generated to have the most relevant results placed near the top of the search results page and less relevant search results near the bottom. Determining the order to list search results can be carried out using any method, including those known in the art. In a preferred embodiment, the search results order obtained using algorithms derived from the accuracy of past search results.

The search results can be weighted or restricted to particular network users. For example, in one embodiment, a search is performed in which the POIs of the social network users in a searcher's friends list are weighted more heavily than POIs from other social network users and are therefore more likely to be included high up in a search results list. In one embodiment, the search results can be restricted to a particular group of social network users, such as a friends list. Alternatively, the display of the search results can be restricted to any portion of the rules of the social network form which the POI database was derived.

FIG. 6 illustrates several example features of a search result 600 performed using an activity-based POI database according to one embodiment of the invention. Search results 600 can be generated using database server 560 on network 520 or using any other suitable computing devise cable of searching a POI database and/or web pages of the World Wide Web.

Search results 600 can include the URL 605, which indicates the location of the search results. The search results include various search result entries including text results 610 and 620 and map results 632. Text results 610 include information from an activity based relational database. Result 610 can be a selectable link to a Facebook activity entry of "Scott Hansen". Result 610 can also be associated with a link 612 to a photograph of biking at Mueller Park in Bountiful, Utah. In one embodiment link 612 can be a public photograph, in which case anyone searching the activity database may access the photograph by selecting the link.

In an alternative embodiment link 612 can be a private photograph that is only displayed when the search user has authorization via social network rules to view the private photograph. The web address for results 610 can be provided in association therewith as text 614.

Result 620 illustrates another search result including public data obtained from the World Wide Web database (internet). Result 620 can be user selectable and direct a user to a particular web page. Text 622 describes features of the web site to which the search user is directed in the selectable link of search result 620. Text 624 provides the top level domain name of the selectable link in result 620.

The search results can include any number of search results and the hierarchy of the list of search results can be determined using algorithms to display the most likely search results that are relevant. In one embodiment the search results from an activity based database can be mixed with search results from a web based database. In an alternative embodiment search results from a web base database can be displayed in different sections of the same search results page. The search results from the activity-based POI database can be weighted more highly than the search results from a public database such as the world wide web, but provide a mix of the most likely relevant search results. In one embodiment, profile information from the social network can also be used to determine the order in which entries of the activity-based database and/or a public database will be displayed. In this manner, the output is displayed in order according to a weighted preference.

In one embodiment the search results can be organized on a map. For example search result 600 can include local result 630 for biking. The map 632 can include a plurality of locations 634 (e.g., 634a, 634b, 634c). Locations 634 identified on the map can be a user selectable link. The search display 600 can include a plurality of location 642 (e.g., 642a, 642b, 642c), written as text corresponding to locations of 634 on map 632. The locations on the map can indicate locations where the activity being searched can be performed. In one embodiment, links 642 can provide links to information about the location, such as information in the social network or a Wikipedia.

The search result can be limited by search preferences 662 and 664, which indicate whether the search results should include information from just the internet and or the activity based POI database.

In one embodiment, the server and/or software providing the search result functionality can store the required username, password, or other login information necessary to access restricted information in the selectable link. In one embodiment, the server and/or software providing the search results can request permission from a third party to access restricted information; for example, a the server can send a friend request to a social $3^{rd}$ party social network user.

In one embodiment the search results 600 can include sponsored links 650, which include one or more paid advertisements. Text 652 is a contextually relevant advertisement for a search performed for "biking. Text 652 can be a user-selectable link that upon being selected direct the user to a web site selling bicycles. Text 656 provides the top level domain of the link to were users are directed.

In a preferred embodiment advertisements can be displayed with the search results of the POI database and/or pages that are linked from the search results. In a preferred embodiment, the search results are contextually related to the activity to be performed at the POI selected. Alternatively or in addition, the advertisement can be selected according to geographic location of the POI.

The present invention includes methods of analyzing the activity terms and name or types of POIs to determine associations between words and predicting how words are intended to be used by the input users and the search users. In one embodiment, repeated searches made by search users and/or selections made by search users are used to infer when a displayed place of interest returned the correct results. The usage data is then used to adjust the categories of the activities to provide the desired search results using few search queries.

In a preferred embodiment, the methods and systems include obtaining the POIs from social network users through a social network. The social network can also include a social network page that displays a list of POIs for a particular social network user. The list can be accessible to all or a portion of the social network users through the social network. For example, the list can be accessed through the web page of the social network user providing the POI list. In this embodiment, the ability of social network friends to view and/or search through the individual POI list motivates the social network user to generate POIs. The motivation arises from the desire to tell other social network users the activities that the social network user has done and where the social network user performs those activities.

Large or enormous social networks can be particular advantageous for generating individual lists of POIs that can then be compared and analyzed to discover patterns in the use of activity terms and/or for providing global coverage of POIs, and/or for providing robust ratings of activities. In one embodiment the social network includes at least about 10,000 unique users, more preferably at least 1 million unique users, and most preferably at least about 10 million unique users.

The POI data can be stored on a social network server and/or copied to a separate POI database server. Where a separate server is used to access the individual lists of the social network users, the POI database can include reference pointers to the data on the social network server and/or copy the data from the social network server and update the information periodically.

In an alternative embodiment of the invention, a method includes generating a POI database from event information stored on a social network. The method includes providing a social network that includes at least 10,000 unique users each having a social network account, each social network user having a personal profile that is created by the respective social network user and associated with the social network account; providing at least 10,000 event entries, each event entry being created by a unique user of the social network and being stored as social network historical data on the social network, wherein each of the event entries includes at least a name or type of an event and a location for the event; generating a POI database including at least 10,000 POI entries, each POI entry created at least in part from the at least 10,000 event entries, respectively, wherein each of the POI entries includes a name or type of event obtained from the event entries and/or an event location obtained from the event entries, the POI entries being stored as a searchable database for points of interest.

Optionally the method can include providing searching of the POI database to a POI searcher, wherein the searching includes retrieving the name or type of the event or the event location from the POI entry in response to a query by the POI searcher.

In an alternative embodiment, the foregoing method can include obtaining an activity from the social network event instead of or in addition to obtaining the name or type of the event from the social network data. The activity is used to create a POI relational database that includes column or list of activities. In addition, the method can include providing searching using an activity keyword.

In yet another alternative embodiment, activity information can be obtained from historical data in a social network wherein the historical data is a "twitter" or a response to a "what are you doing now" comment. In this embodiment, place of interest can be generated by deriving an activity from the historical social network data and deriving the location of the electronic device making the twitter. For example, the POI can be created from the activity identified in the twitter and the coordinates of a GPS enabled phone at the time that the twitter is made. The activity identified in the twitter and the location of the twitter can be stored in a relational database as a place of interest that can be searchable.

The location where the historical data was generated can be obtained using several different methods. In one embodiment, the network user can be asked to provide the information. In another embodiment, the location can be obtained from a GPS enabled mobile device near the time in which the historical data is generated (i.e. within seconds or minutes). In yet another alternative embodiment, a known location of a router or other receiver receiving the upload of the historical data to the social network can identify the location or geographic area where the historical data was created. In yet another embodiment, the location can be associated with a picture using a desktop application (e.g. Apple's iphoto) and the photograph uploaded to the social network server.

In one embodiment, other social network historical data can be used to identify the location of the particular social network data providing the activity to be used in the POI relational database. For example, the location of the activity can be assigned based on the personal profile location of the person submitting the historical text that includes the activity. In one embodiment, the location of the historical data (i.e., the location where the historical data was generated) can be an imprecise location as described above with respect to automatically geocoding photographs. A refined location of the historical text can also be obtained from the user as described above.

This embodiment typically entails identifying an activity in historical data that includes information other than activities. Not all social network historical data (e.g., twitters) include words that relate to activities. For example, in Facebook twitters or "news feeds" are created using a text box that starts, "NetworkUser is . . . " and the social network user completes the sentence in the text box. A network user can complete the sentence with something like "NetworkUser is drafting a patent application" Or something like "NetworkUser is hungry." As illustrated in these examples, not all comments include activities. "drafting a patent application" is an activity, but being "hungry" is not. In one embodiment, in making the places of interest using historical data, the historical text is analyzed to distinguish between activities and non-activities and the activities are stored in the relational database as activities in association with a location. The distinction between activities and non-activities can be made by a person analyzing the historical text or preferably the process is automated using computer software. For example, in one embodiment, software can be used to parse the historical text for certain word types that indicate an activity, such as present participles (e.g., words in English that end in "ing") which are indicative of an activity (i.e., doing).

Identifying an activity and associating a location with the activity for tens of thousands of occurrences of historical text containing activities can be used to generate a POI database. By storing the information in a relational database where at least one of the columns or groups is a "activity," the POI database can be keyword search for activities. Although not required, the name or type of the place of interest can also be obtained for all or a portion of the activities. The name or type of place of interest can be obtained using any technique including asking the social network user for the name or type of the place of interest, deriving the name or type of place of interest from historical social network data, and/or using the POI location to look up the name or type of place in a POI database that describes places of interest based on name or type and location.

For any of the database searches performed in the embodiments described in the present disclosure, the activity search is preferably carried out by receiving an activity keyword from the searcher and comparing the activity keyword to the group, column, or list of activities stored in the relational database. By storing the activities separate from names and types of points of interest in the relational database, the relational database searches can yield desired search results with relevant activities. Moreover, the search results can be more accurate and relevant than inferring an activity from a name or type of POI. In these embodiments, it is preferable that the search user be provided with an input box that includes associated text to indicate to the user that the input criteria should be an activity. For example, a user interface can provide a search box for typing a keyword and text associated with the box can indicate that the input criteria is an activity. In one embodiment the indicative text can be placed near the box on the same page (e.g., directly above or below the box). In one embodiment, indicative text can be placed in the box; in which case the text can disappear as the search user begins to type in an activity search term. In one embodiment, the search user interface can include an input box for both the type or category of a POI and an activity for a POI. Providing two boxes is advantageous because it alerts the searcher to the fact that the search program is capable of performing different types of searches (i.e., name or type keyword vs. activity keyword) or alternative a combination of the two. In yet another embodiment, a drop down menu can be used to indicate to the user that a search based on activity can be performed. In this embodiment, a single text box for the searcher to enter text can be provided and then a drop down menu can be provided in association with the single text box. The drop down menu can provide a list of searching options, at least one of which includes searching by activity and/or searching by activity in combination with the name or type of POI.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Detailed descriptions of apparatus and processing techniques known in the field of the invention to one of ordinary skill in the art have been excluded for convenience and clarity to the reader.

We claim:

1. A computer implemented method for providing search results from a private database in combination with a web-based search, comprising:
  receiving a search request from a search request user, the search request user having a social network account that allows the social network user to form relationships by invitation with other social network users and to share private social network data on the social network through the relationships;
  providing one or more databases including a plurality of database entries, a first portion of the database entries including private network data from the social network account or an index thereof and a second portion including public non-social network data that is publicly accessible on the World Wide Web;
  receiving authentication data associated with the search request user, wherein the authentication data identifies access rights of the search request user to the social network data from the social network account or index thereof;
  searching the plurality of database entries to generate a plurality of search result items, a first portion of the search result items including private social network data from the social network account or an index thereof and a second portion of search result items including public non-social network data;
  determining whether the search request user has access rights to the first portion of the search result items;
  ranking the search result items according to relevancy to generate a search result; and
  providing to the search request user the search result for display on a graphical user interface, the search result comprising one or more lists of selectable links,
    a first portion of the selectable links linking to private network data to which the search request user has access rights; and
    a second portion of the selectable links linking to public non-social network data.

2. The computer implemented method of claim 1, wherein the search result includes a link to the website Wikipedia.org.

3. The computer implemented method of claim 1, wherein the social network account is cart of a social network having at least 1 million unique users.

4. The computer implemented method of claim 1, wherein the private network data from the social network account includes private photographs.

5. A computer program product in the form of instructions recorded on a tangible medium for providing search results to a search request user requesting a search, the computer program product comprising instructions for performing the method of claim 1.

6. The computer implemented method of claim 1, wherein the first portion of database entries include a keyword index of private network data from the social network account and the links provided in the search result includes at least one link to a social network database on a social network server.

7. The computer implemented method of claim 1, wherein the search result items are ranked using historical search data to generate the list of selectable links.

8. The computer implemented method of claim 7, wherein the historical search data includes private social network data from the social network account of the search request user.

9. The computer implemented method of claim 7, wherein the ranking is determined in part using an algorithm that applies one or more weighting terms.

10. The computer implemented method of claim 9, wherein the weighting term is derived from social network data.

11. The computer implemented method of claim 10, wherein the social network data used to derive the weighting term is an established social network relationship.

12. The computer implemented method of claim 9, wherein historical search data associated with the established network relationship is used in ranking at least a portion of the search result items.

13. The computer implemented method of claim 9, wherein the weighting term derived from the private social network data is used to rank at least a portion of the search result items associated with non-social network data.

14. The computer implemented method of claim 1, further comprising storing logon information for obtaining access to one or more social networks of the user.

15. The computer implemented method of claim 1, wherein the one or more databases includes a relational database having a plurality of activity entries and a plurality of locations respectively associated therewith.

16. The computer implemented method of claim 1, further comprising displaying an advertisement in association with the search results, wherein the advertisement is selected at least in part based on one or more keywords received in the search request.

17. The computer implemented method of claim 1, wherein the first portion of database entries include private social network data associated with permission rules.

18. The computer implemented method of claim 17, wherein the permission rules identify social network users with access rights to the social network data.

19. The computer implemented method of claim 17, wherein the permission rules are rules established on the social network at least in part by the search request user.

20. The computer implemented method of claim 17, wherein the permission rules are rules established at least in part by the one or more social network users having a relationship with the search request user on the social network.

\* \* \* \* \*